United States Patent [19]

Schmitt

[11] Patent Number: 4,594,538

[45] Date of Patent: Jun. 10, 1986

[54] MONITORING CIRCUIT FOR POSITIONING DEVICE

[75] Inventor: Walter Schmitt, Traunreut, Fed. Rep. of Germany

[73] Assignee: Dr. Johannes Heidenhain GmbH, Traunreut, Fed. Rep. of Germany

[21] Appl. No.: 650,984

[22] Filed: Sep. 14, 1984

Related U.S. Application Data

[63] Continuation of Ser. No. 378,907, May 17, 1982, abandoned.

[30] Foreign Application Priority Data

Jun. 6, 1981 [DE] Fed. Rep. of Germany ....... 3122621

[51] Int. Cl.$^4$ ............................................ G05B 23/02
[52] U.S. Cl. ..................................... 318/565; 318/601; 318/604; 318/317
[58] Field of Search ............... 318/565, 563, 652, 638, 318/600, 601, 603, 317, 341, 604; 364/183, 565; 340/347 M

[56] References Cited

U.S. PATENT DOCUMENTS 3,778,696 12/1973 Walters ................................ 318/565
3,828,742 8/1974 Weis .................................... 123/351
3,996,454 12/1976 Froyd ................................. 318/565
4,083,043 4/1978 Breuer ............................. 340/347 M

FOREIGN PATENT DOCUMENTS 2207224 2/1972 Fed. Rep. of Germany.
2258382 6/1974 Fed. Rep. of Germany.
2337199 10/1974 Fed. Rep. of Germany.
2505585 8/1976 Fed. Rep. of Germany.
2548717 5/1977 Fed. Rep. of Germany.
2065328 11/1980 United Kingdom.

OTHER PUBLICATIONS

German Document Elektronic (1980, No. 18, pp. 47–54).

Primary Examiner—William M. Shoop, Jr.
Assistant Examiner—Patrick C. Keane
Attorney, Agent, or Firm—Willian Brinks Olds Hofer Gilson & Lione Ltd.

[57] ABSTRACT

A speed monitoring circuit is disclosed for an automatic positioning system. This speed monitoring circuit composes a measurement of the actually present speed determined from measurement signals generated by an incremental position measuring device with the desired speed commanded by the positioning system. The difference between the actual and commanded speed is detected and, in the event of an excessive deviation, a warning or an automatic termination of operation of the positioning system is provided. In the disclosed system, the desired speed is determined by a controller in which a digital computer calculates the difference between the instantaneous position of one relatively movable machine component and the desired position of the movable component as established by programmed data.

3 Claims, 14 Drawing Figures

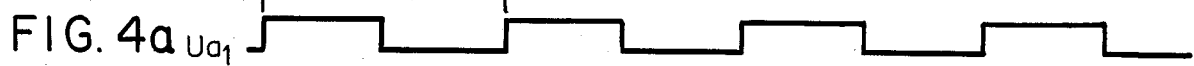
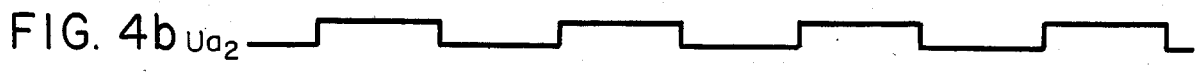
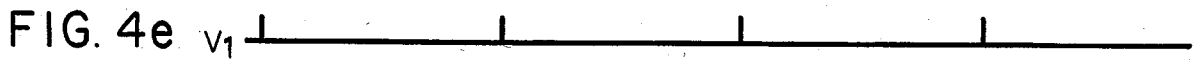
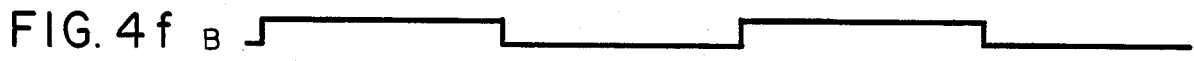
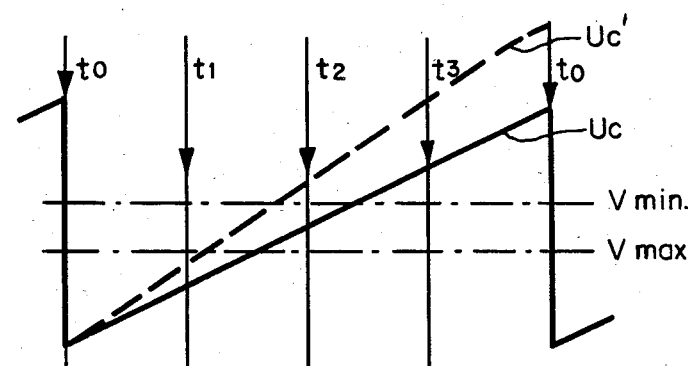
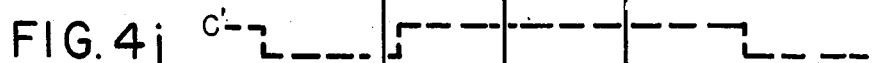

MONITORING CIRCUIT FOR POSITIONING DEVICE

This application is a continuation of application Ser. No. 6,378,906, filed May 17, 1982 now abandoned.

BACKGROUND OF THE INVENTION

This invention relates to a velocity monitoring system for use in connection with an apparatus for positioning a first component relative to a second component. The monitoring system of this invention is particularly useful in connection with positioning apparatus of the type which includes drive means for moving the first component, means for controlling the drive means to move the first component at a desired velocity, and means for measuring the actual position of the first component with respect to the second component and for generating position values representative thereof.

Positioning devices of the general type described above are known to the art. In the German publication ELEKTRONIK (1980, No. 18, pp. 47-54) there is described a positioning system in which electromechanical components are used to position an object to preselected spatial positions in response to presettable variable inputs.

In this positioning system there is provided a speed regulating circuit which operates to control a drive motor in such a way that the velocity of the component being moved is increased initially, and this velocity is reduced before the component reaches the desired position. In this way, the component does not overrun the desired position.

The disclosed positioning device regulates the velocity of the component being moved in response to the output of a tachogenerator coupled to the motor, which provides direct measured values of the component speed. The regulated speed can, therefore, be erroneous if the tachogenerator fails for any reason. In the event of an error in the speed regulation of the motor, the safety of the operator can be endangered. Furthermore, the positioning system itself, as well as any workpiece being formed, can be severely damaged if the first component is caused to move at an erroneous speed.

SUMMARY OF THE INVENTION

The present invention is directed to a speed monitor which monitors a large number of the total number of elements of a positioning system related to speed regulation. The monitor of this invention checks for error-free regulation of the speed of the first component with respect to the second component, and in this way enhances the safety of positioning systems which incorporate the monitor.

According to this invention, means are provided for comparing a signal indicative of the desired velocity of the first component with the actual velocity of the first component. This comparing means acts to generate at least one binary signal, the logical state of which is indicative of whether the desired velocity deviates from the actual velocity by more than a preselected amount. This binary signal can be used to control visual or auditory alarms, or can even be used to terminate operation of the positioning system automatically in the event of excessively high or excessively low velocity of the first component. The dependent claims attached hereto set out further advantageous features of this invention.

This invention provides the important advantage in terms of highly reliable monitoring of the positioning system. As described below in connection with the presently preferred embodiment, this invention can be used to monitor the proper functioning of all of the following components of a positioning system: the position measuring device which measures the position of the first component with respect to the second component, the measuring signal processing device, the direction discriminating device, the servo system, the digital to analog converter, as well as the components of the monitoring circuit itself.

The invention itself, together with further objects and attendant advantages, will best be understood by reference to the following detailed description taken in conjunction with the accompanying drawings.

BRIEF DESCRIPTION OF THE DRAWINGS

FIGS. 4a through 4k are wave form diagrams of various signals generated by the embodiment of FIGS. 1 through 3. In each of the FIGS. 4a through 4k, the horizontal axis is the time axis, and the time axes of these figures are aligned such that vertically aligned events occur simultaneously.

DETAILED DESCRIPTION OF THE PRESENTLY PREFERRED EMBODIMENT

Figure 1:
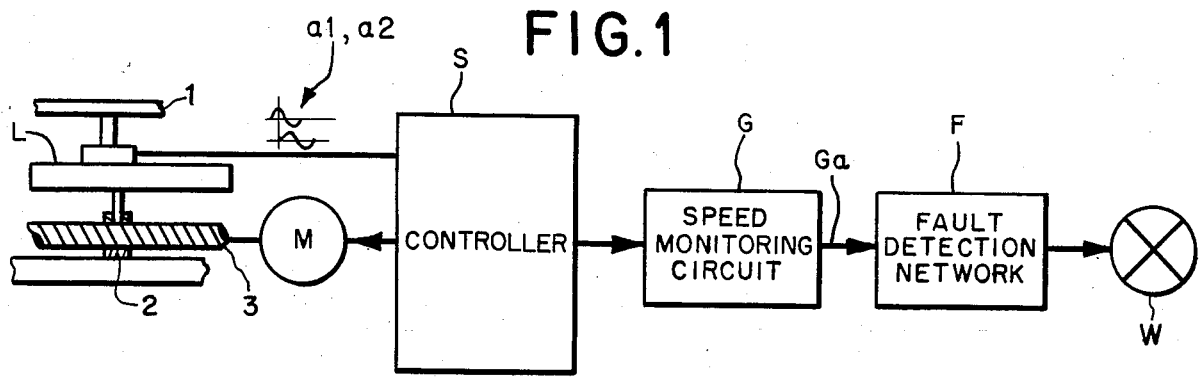
FIG. 1 is a block diagram of a positioning system which incorporates a preferred embodiment of the monitoring circuit of this invention.

Turning now to the drawings, FIG. 1 shows a block diagram of a positioning system which incorporates a preferred embodiment of the speed monitoring circuit of this invention. As shown in FIG. 1, this system includes a length measuring device L which is arranged in the usual manner on the bed 1 and the slide 2 of a machine tool. In this embodiment the length measuring device L is an incremental measuring device and is of the general type described, for example, in German Pat. No. 25 05 585. The positioning system includes a controller S which controls a drive arrangement M in response to programmed data. The drive arrangement M operates to turn a spindle 3 which in turn shifts the slide 2 longitudinally relative to the bed 1. The movement of the slide 2 with respect to the bed 1 is registered by the length measuring device L which generates measurement signals a1,a2 which are supplied as inputs to the controller S. The controller S operates to process the measurement signals a1,a2 in conjunction with the programmed data.

Figure 2:
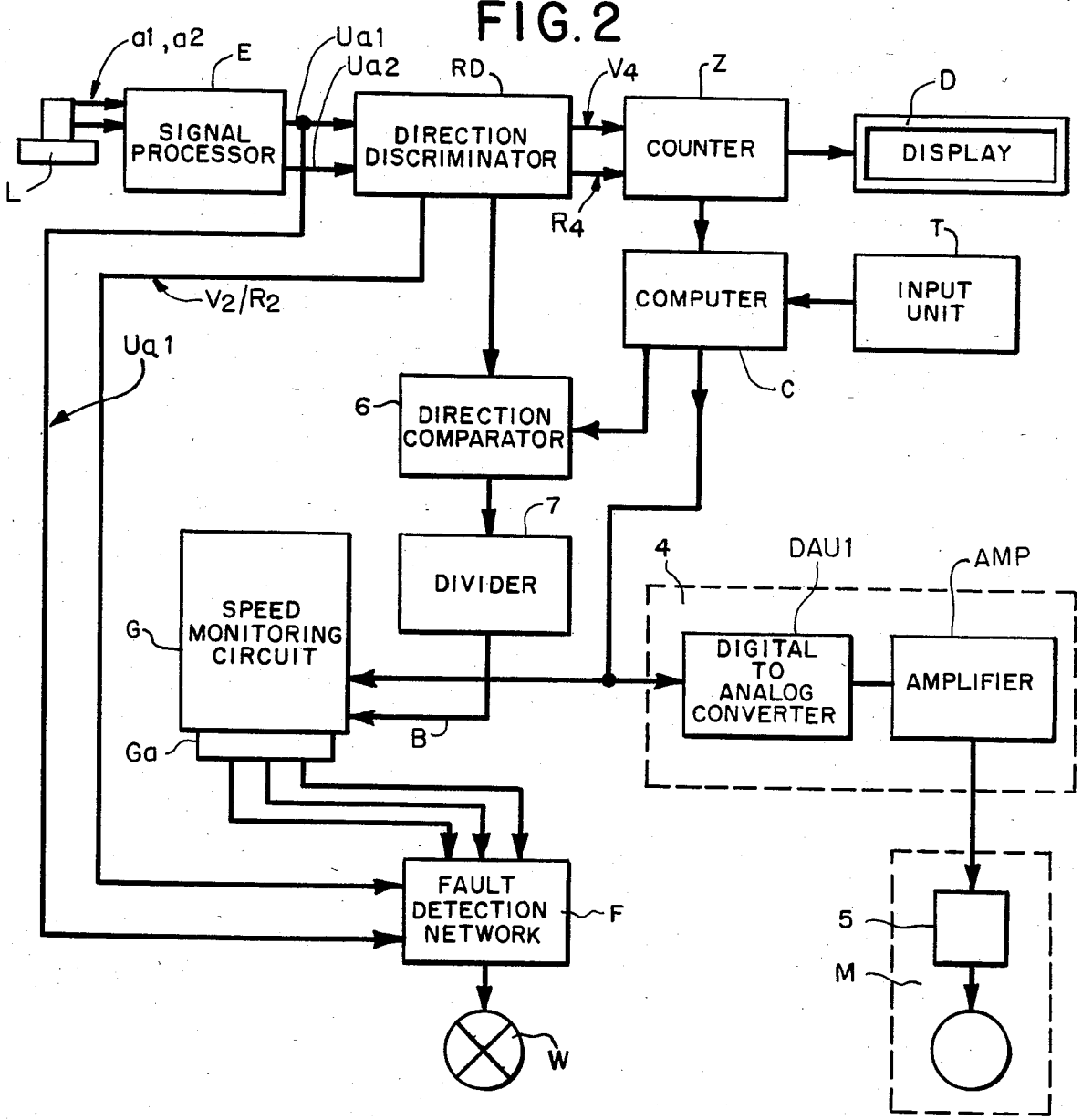
FIG. 2 is a more complete block diagram of the electrical components of the positioning system of FIG. 1.

As shown in FIG. 2, the controller S is coupled to a speed monitoring circuit G, which receives both a measurement signal V1 derived from the measurement signals a1,a2, as well as signals generated by the controller from the programmed data representative of the desired velocity of the machine components 1,2. The speed monitoring circuit G generates signals at output Ga which are applied to a fault detection network F. This network F is in turn connected to a warning lamp W which signals an alarm if the actual measured velocity of the slide 2 relative to the bed 1 deviates excessively from the desired velocity. Of course, it should be understood that the fault detection network F can be coupled to generate an acoustical warning, or to interrupt operation of the positioning system automatically, instead of operating the warning lamp W.

The block diagram of FIG. 2 sets out the essential electrical components of the positioning system. As shown in FIG. 2, the measurement signals a1,a2 generated by the incremental length measuring device L are amplified, triggered, and possibly interpolated for intermediate value determination in a measurement signal processor E. This processor E acts to generate binary measurement signals Ua1,Ua2, which are supplied to a direction discriminator RD. This discriminator RD acts to determine the direction of movement of the slide 2 relative to the bed 1 of the machine tool, and to generate counting signals V4,R4, as appropriate, to an up-down counter Z. The counter Z acts to count the signals and to display the running sum numerically as a digital value in a display device D.

The direction discriminator RD also includes means for processing the binary measurement signals Ua1, Ua2 to generate further signals V1, R1, V2, and R2. The signals V1,R1 are periodic signals having a frequency corresponding to that of the measurement signals a1,a2, while the signals V2,R2 are periodic signals having a frequency twice that of the measurement signals a1,a2, and the signals V4,R4 are periodic signals having a frequency four times that of the measurement signals a1,a2. The running sum kept by the counter Z is applied to a digital computer C as the actual, measured value of the position of the slide 2 relative to the bed 1. An input unit T (such as a keyboard, magnetic tape unit, paper tape unit or the like) is provided to supply the desired value for the position of the slide 2 relative to the bed 1. This desired position is supplied to the digital computer C as a digital value. The computer C is programmed to process the actual and desired position values to calculate whether the slide 2 should be moved relative to the bed 1. In the event that a change of position of the slide 2 is appropriate, the computer C generates at its output a digital value representative of the desired velocity of the slide 2 relative to the bed 1. In this embodiment, this output signal is proportional to the desired displacement velocity of the slide.

This output signal generated by the digital computer C is applied to a component 4 which includes a digital to analog converter DAU1 and an amplifier AMP. This component 4 generates a control signal corresponding to the desired value of the displacement velocity of the slide 2. This control signal is applied to the drive arrangement M, which may contain additional components such as a servo device, a tachogenerator, and the like in addition to the motor.

Figure 3:
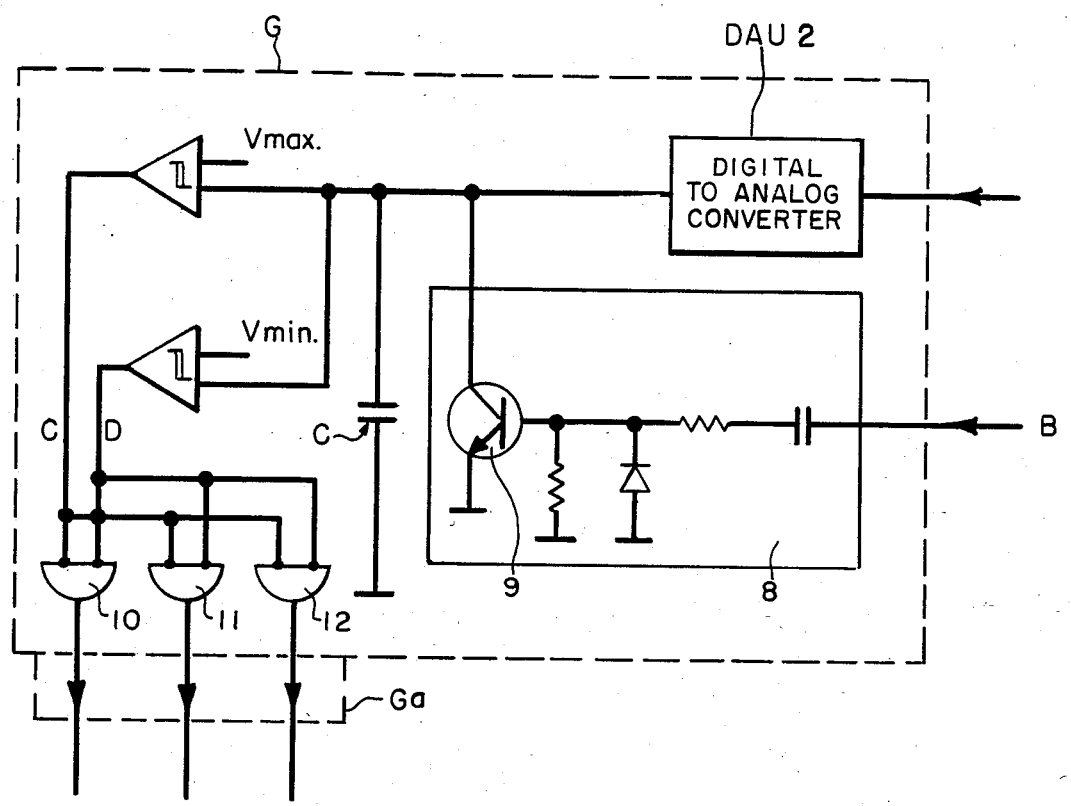
FIG. 3 is a block diagram of the monitoring circuit G of FIGS. 1 and 2.

The output signal supplied by the computer C to the component 4 is also applied to the monitoring circuit G, where (as shown in FIG. 3) it is transformed by a digital to analog converter DAU2 into a current proportional to the desired velocity of the slide 2. This current charges a capacitor C, the voltage Uc of which rises in proportion to the charging time.

Counting signals V1,R1, which are derived from the direction dependent binary counting signals V4,R4 supplied by the direction discriminator RD to the counter Z, are supplied to a direction comparator 6. This direction comparator 6 also receives an input from the computer C indicative of the direction of motion commanded by the computer C. The direction comparator combines these two inputs in a known manner such that the output of the direction comparator 6 is a binary signal corresponding to V1,R1 only if the sign information (positive or negative) supplied by the digital computer C agrees with the forward or backward signal V1 or R1; that is, only if direction coincidence is present. This signal is supplied to a divider 7, the binary output signal of which is synchronized with and at half the frequency of the input signal supplied by the direction comparator 6. The output of the divider 7 is supplied as a beat signal B to the monitoring circuit G.

Returning to FIG. 3, the half frequency beat signal B derived from the measurement signals Ua1, Ua2 is fed to a discharging circuit 8, the switching transistor 9 of which periodically discharges the capacitor C, the time of discharge being determined by the beat frequency of the last mentioned signal B.

Accordingly, during movement of the slide 2 the capacitor C has imposed upon it a sawtooth voltage Uc, the value of which is determined by the desired value for the speed of movement of the slide 2 and indirectly by the measurement signals a1, a2 generated by the measuring device L. This sawtooth voltage Uc is applied to two comparators, each of which compares the voltage Uc to a respective reference level, Vmax, Vmin. The comparators generate binary signals C,D according to the result of the comparison between the sawtooth voltage Uc and the respective reference level Vmax, Vmin. The binary signals C,D are logically combined by logical gates 10,11,12. Thus, at the output Ga of the monitoring circuit G there is present a combination of binary signals, from which an error signal is derived which triggers the sounding of an optical or acoustical alarm, or which can be used to terminate the movement of the slide 2.

The combination of the binary signals at Ga can also be connected to an error detection network F so that substantially all the elements of the positioning system can be monitored for errors. Such an error detection network is described, for example, in German Pat. No. 22 07 224. This patent provides sufficient information to allow one skilled in the art to adapt the disclosed network to the requirements of the present positioning system.

FIGS. 4a through 4k represent a number of voltage wave forms which will be used the describe the operation of the embodiment of FIGS. 1 through 3.

Turning now to FIG. 4a, the binary signal Ua1 changes its logical state periodically with a period GK. This binary signal Ua1 is derived from the analog measurement signal a1 which is generated by means of the scanning unit which scans a grid scale included in the incremental length measuring device L. This grid scale is made up of a multiplicity of parallel lines, the grid constant of which is equal to GK. In the signal processor E the analog measurement signal a1 is amplified, triggered, and possibly multiplied by interpolation. The signal processor E acts to generate at its output the binary signal Ua1 shown in FIG. 4a. The length measuring device L also generates a second analog measurement signal a2 which is shifted by 90° with respect to the measurement signal a1. This second measurement signal is required for the detection of the direction of movement of the slide 2 with respect to the bed 1, and is processed in the same manner as the analog measurement signal a1. The signal processor E, therefore, generates at its output a second binary signal Ua2, which is shown in FIG. 4b.

These two binary signals Ua1,Ua2 are processed in a known manner in the direction discriminator RD. The discriminator RD acts to determine the direction of movement of the slide with respect to the bed and to generate the signals V1,R1, V2,R2, V4 and R4. The signals V1,V2 and V4 are defined as forward counting signals which are generated when the slide moves in a forward direction with respect to the bed; the signals R1, R2 and R4 are defined as backward movement signals which are generated when the slide moves in a backward direction with respect to the bed. The operation of the embodiment of FIGS. 1 through 3 can be properly explained in the context of only one direction of movement, and therefore FIGS. 4c, 4d and 4e present only the forward movement signals V4,V2,V1. As can be seen in FIGS. 4c, 4d and 4e, the period of V4 is one-fourth that of V1, the period of V2 is one-half that of V1, and the three sets of pulses are synchronized so that a V1 pulse occurs simultaneously with a V2 pulse and a V4 pulse. The signal V1 is applied to the divider circuit 7 which generates the binary beat signal B having half the frequency of signal V1, as shown in FIG. 4f. FIGS. 4a through 4f show the time synchronization of the signals discussed above.

FIG. 4g represents the sawtooth voltage wave form Uc imposed on the capacitor C as explained above in conjunction with FIG. 3. The capacitor charging current, which is proportional to the desired value of the velocity of the slide 2 selected by the controller S, commences at the time point tO to charge the capacitor C. The voltage Uc across the capacitor C rises in the course of time t as shown by the continuously drawn rising line of FIG. 4g. At the time point t0, the beat signal B changes from the logic low state to the logic high state, and the capacitor C is discharged. The dot-and-dash lines which run horizontally across FIG. 4g indicate the voltage levels of the two comparator reference levels Vmax and Vmin. At the intersection point of the sawtooth voltage wave form Uc with the reference levels Vmax, Vmin, the respective comparators are triggered and the binary signals C,D are generated, as shown in FIGS. 4h and 4c. The comparator which operates to compare the voltage Uc with the reference Vmax generates the binary signal C, and the comparator which compares the voltage Uc with the reference level Vmin generates the binary signal D.

The logical state of the binary signals C and D is used as a measure of whether the positioning system is operating properly, or whether a malfunction has occurred. At certain predetermined testing times t1,t2,t3 (which are exactly established by the pulses of signals V1 and V2 and which depend, therefore, on the frequency of the measurement signals a1,a2) the logical states of the binary signals C,D are checked. The result of this check of the logical state of the signals C,D at different test times provides an unambiguous indication of whether trouble-free operation is present. In this example, trouble-free operation of the positioning system is present when the following truth table is fulfilled:

| t | C | D |
|---|---|---|
| t1 | L | L |
| t2 | H | L |
| t3 | H | H |

That is, at the test time point t1, proper operation corresponds to both of the binary signals C,D being in the logic low state. At the testing time point t2, proper operation of the positioning system corresponds to the binary signal C being in the logic high state, and the binary signal D being in the logic low state. At the third testing time point t3, proper operation of the positioning system corresponds to both of the binary signals C,D being in the logic high state.

The dashed line of FIG. 4g represents the wave form of the capacitor voltage U'c during one type of faulty operation of the positioning system. In this case the actual velocity of the slide 2 is lower than that commanded by the computer C. The charging current derived from the desired value for the velocity leads to the wave form U'c represented in broken lines in FIG. 4g. Since the actual speed of the slide 2 is, however, too low in this example, the discharging time point tO, which is derived from the measurement signals, is delayed as compared with the example of operation discussed above. In consequence, at the time point tO the capacitor C is charged to a higher voltage U'c. Thus, the rise of the capacitor voltage U'c with respect to the measurement signal frequency (number of measurement signal periods per time unit) is steeper than when the positioning system is operating properly as described above. However, the comparator thresholds Vmax, Vmin, remain unaltered and, therefore, the capacitor voltage U'c causes both comparators Vmax, Vmin to be triggered at an earlier point in time, thereby causing the binary signals C', D' to be shifted, as shown in FIGS. 4j and 4k. The testing time points t1, t2, and t3 are, however, precisely established by the measurement signals. Therefore, the binary states of the signals C', D' at the predetermined testing time points differ from the binary states of binary signals C,D discussed above in connection with FIGS. 4h and 4i. The following table sets forth the states of the signals C', D' at the three test time points t1, t2, t3:

| t | C' | ⁻D' |
|---|----|----|
| t1 | L | L |
| t2 | H | H |
| t3 | H | H |

Note that at testing time point t1 both binary signals C' and D' are in the logic low state; at testing time point t2 both binary signals C' and D' are in the logic high state; and at testing time point t3 both binary signals C' and D' are again in the logic high state. Since the logical state of the signals C', D' at testing time point t2 differs from the logical state of binary signals C,D at testing time point t2, this discrepancy can be used as a measure of excessively low velocy of the slide 2. The error detection network F of FIG. 2 is constructed to detect and respond to such a discrepancy by triggering an alarm, or by terminating movement of the slide 2 with respect to the bed 1.

The type of failure discussed above relates to excessively low velocities of the slide 2, which are in general not a critical type of failure. However, the same techniques can be used to monitor the actual velocity of the slide 2 for excessively high speeds, conditions which are extremely important to recognize at an early stage. From the foregoing discussion, one skilled in the art will recognize that the reference levels Vmax,Vmin can be adjusted in such a way that only the maximum speed is monitored. In this case, only one comparator Vmax would suffice for the determination of the error.

Likewise, this invention can be adapted in such a way that the velocity of movement of the slide 2 is monitored in two ranges with different tolerances. For this purpose, three or four comparators with different reference levels can be provided, such that from a first range corresponding to the first reference levels only a warning of out-of-tolerance speed is generated, as for example by an optical or acoustical alarm. However, if the warning range established by these first comparators is exceeded, the monitoring circuit can be constructed to terminate operation of the positioning system automatically. This function can be provided by an additional set of comparators having respective reference levels. Likewise, the invention can be modified such that the operation of the positioning system is automatically terminated if the warning alarm is triggered for an excessively long period of time.

Of course, it should be understood that various changes and modifications to the preferred embodiments described above will be apparent to those skilled in the art. For example, the monitoring circuit of this invention can be embodied in alternate electronic technologies using alternate components. It is, therefore, intended that the foregoing description be regarded as illustrative rather than as limiting, and that it be understood that it is the following claims, including all equivalents, which are intended to define the scope of this invention.

I claim:

1. In an apparatus for positioning a first component relative to a second component, said apparatus comprising drive means for moving the first component, means for controlling the drive means to move the first component at a desired velocity, and means for measuring the actual position of the first component with respect to the second component and for generating position values representative thereof, the improvement comprising:

means for generating a first signal indicative of the desired velocity;
a capacitor;
means for charging the capacitor at a rate corresponding to the first signal;
means for periodically discharging the capacitor at a discharge frequency which varies in accordance with the actual velocity of the first component with respect to the second component such that during movement of the first component a sawtooth waveform appears on the capacitor;
first and second comparators, each of which compares the voltage on the capacitor with a respective threshold and generates a respective binary signal indiative of the outcome of the comparison, said thresholds selected such that the sawtooth waveform on the capacitor repetitively crosses both of the thresholds during normal operation of drive means and the controlling means; and
means for checking the states of the binary signals at a plurality of test times and for generating at least one alarm signal in the event the states of the binary signals deviate from a preselected pattern indicative of normal operation of the drive means and the controlling means, each of said test times being a respective discrete selected instant in time determined as a function of the discharge frequency and occurring at respective intermediate state of charging of the capacitor, said preselected pattern comprising a plurality of subpatterns, each associated with a respective test time, at least two of said subpatterns differing from one another;
said capacitor, charging means, discharging means, comparators and checking means cooperating to monitor discrepancies between the desired and actual velocities and to generate the alarm signal in the event of excessive discrepancies.

2. The invention of claim 1 wherein the thresholds, the test times, and the selected pattern are chosen such that the checking means generates one of the at least one alarm signals both when the desired velocity is greater than the actual velocity by more than a first selected amount and when the desired velocity is less than the actual velocity by more than a second selected amount.

3. The invention of claim 1 wherein the control means comprises a digital computer; means for supplying the actual position of the first component and the desired position of the first component to the computer; means, included in the computer, for generating a digital velocity signal indicative of the desired velocity of the first component as a function of the difference between the actual and desired positions of the first component; means, responsive to the digital velocity signal, for generating an analog velocity signal and for supplying the analog velocity signal to the moving means; wherein the measuring means comprises means for generating a sequence of pulses, the frequency of which varies with the actual velocity of the first component; and wherein the comparing means comprises means for comparing the first signal with the frequency of the sequence of pulses.

* * * * *

UNITED STATES PATENT AND TRADEMARK OFFICE
CERTIFICATE OF CORRECTION

PATENT NO. : 4,594,538
DATED : June 10, 1986
INVENTOR(S) : Walter Schmitt

It is certified that error appears in the above-identified patent and that said Letters Patent is hereby corrected as shown below:

In column 3, line 42, after "slide" please insert --2--.

In column 4, line 43, please delete the first occurrence of "the" and substitute therefor --to--.

In column 6, line 50, please delete "velocy" and substitute therefor --velocity--.

Signed and Sealed this

Eighth Day of August, 1989

Attest:

DONALD J. QUIGG

Attesting Officer

Commissioner of Patents and Trademarks